(No Model.)
W. E. HILL.
SAW GUIDE.
No. 257,704. Patented May 9, 1882.
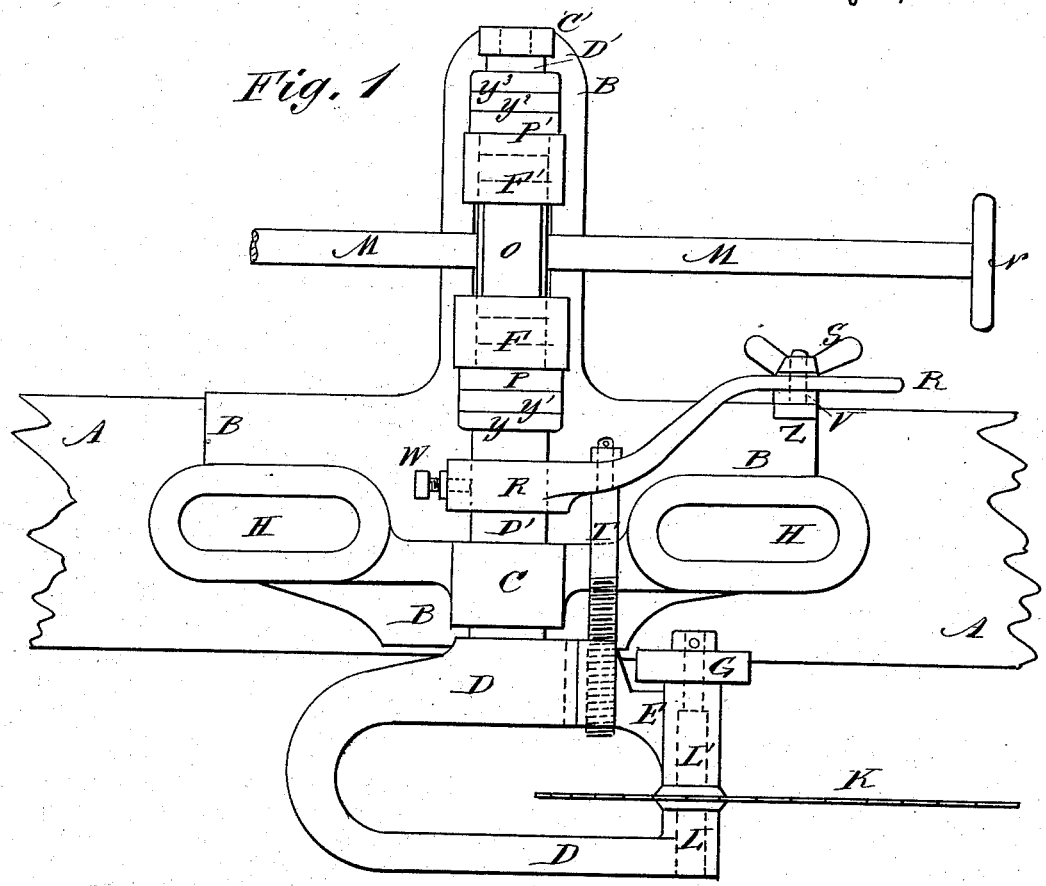
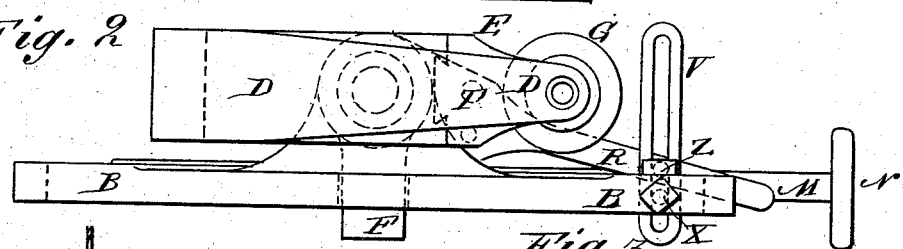
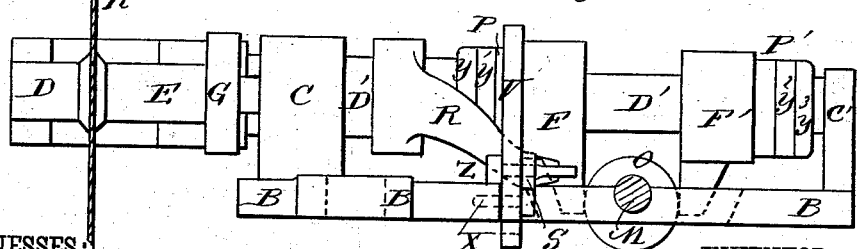
WITNESSES:
C. Neveux
C. Sedgwick
INVENTOR:
W. E. Hill
BY Munn & Co
ATTORNEYS.

UNITED STATES PATENT OFFICE.

WILLIAM E. HILL, OF BIG RAPIDS, MICHIGAN.

SAW-GUIDE.

SPECIFICATION forming part of Letters Patent No. 257,704, dated May 9, 1882.

Application filed May 10, 1881. Renewed March 27, 1882. (No model.)

*To all whom it may concern:*

Be it known that I, WILLIAM E. HILL, of Big Rapids, in the county of Mecosta and State of Michigan, have invented a new and useful Improvement in Saw-Guides, of which the following is a full, clear, and exact description.

In the accompanying drawings, Figure 1 is a plan view of my improvement. Fig. 2 is a side elevation of the same. Fig. 3 is a front elevation of the same, partly in section.

The object of this invention is to steady saws, keep them in exact position, and prevent the breaking of the saw or guides by a sudden jar.

A represents a portion of the saw-mill frame, to which the guide is bolted in such a position as to receive the saw K between the jaws D E.

B is the bottom or base plate, which has two slots, H, formed through it to receive the bolts, by which it is secured to the frame A adjustably.

To the plate B are attached two bearings, C C', to receive the shaft, journal, or pivot D' of the jaws D E.

To the journal D' is secured by a set-screw, W, the lever R, by means of which the said journal D' can be turned to raise and lower the jaws D E to bring them nearer to or farther from the timber to be sawed.

To the jaw E is pivoted a small wheel, G, to support the part of the timber that is outside of the saw, so that the said wheel will be raised and lowered with the jaws D E by operating the lever R. The jaws D E are turned back from the saw K by operating the lever R to allow the saw to be readily changed when desired. The jaws D E can be reversed or changed from right to left by operating the lever R, the journal D' acting as a swivel. The jaws D E are made hollow, as indicated by dotted lines at the points L L' in Fig. 1, and the cavities or spaces thus formed are filled with leather or rawhide for the saw K to wear against, so that the saw will run smoothly and without noise. The parts of the jaws D E that bear against the saw K are made flaring or cone-shaped, as shown in Figs. 1 and 3, to prevent dust and slivers from being drawn in between the said jaws and saw and heating the saw.

V is a link secured to the plate B by a bolt, X, and connected with the lever R by a bolt, Z, and hand-nut S, so that the said lever can be firmly secured in any position into which it may be adjusted, and will thus hold the jaws D E and wheel G securely in place. The jaw E is dovetailed to and slides upon the shank of the jaw D, and to it is attached a rod, T, which is also attached to the lever R, so that the said jaw E can be adjusted to regulate the space between the jaws D E, as the thickness of the saw K may require.

M is a shaft placed at right angles with the journal D' of the jaw D in bearings attached to the plate B, and having a hand-wheel, N, attached to its end for convenience in turning it.

To the shaft M is secured, by a feather, key, or other suitable means, an eccentric, O, so that the guide can be slid upon the shaft M to adjust the said guide as the diameter of the saw may require. The eccentric O is placed between two lugs, F F', placed upon the journal D', and secured in place by the jam-nuts $y$ $y'$ $y^2$ $y^3$, screwed upon the said journal D, so that the guide can be moved laterally in either direction by turning the shaft M. Between the lugs F F' and the jam-nuts $y$ $y'$ and $y^2$ $y^3$ are interposed rubber washers or cushions P P' to take up lost motion caused by wear, and also to give elasticity to the guide to prevent the saw or guide from being broken by a sudden jar.

Having thus described my invention, what I claim as new, and desire to secure by Letters Patent, is—

1. A saw-guide constructed substantially as herein shown and described, consisting of the adjustable swiveled jaws D E, having journal D' and rod T, the adjusting-lever R, the adjustable lugs F F', the eccentric O and shaft M, and the elastic cushions P P', as set forth.

2. In a saw-guide, the combination, with the journal D' of the jaws D E, of the adjustable lugs F F', the eccentric O, and its shaft M, substantially as herein shown and described, whereby the guide D E can be adjusted laterally, as set forth.

3. In a saw-guide, the combination, with the journal D' of the guide D E, the lugs F F', and the eccentric O, of the elastic cushions P P', substantially as herein shown and described, whereby the breaking of the saw or guide by a sudden jar is prevented, as set forth.

4. In a saw-guide, the combination, with the lever R, attached to the journal D' of the jaws D E, of the link V, the bolts X Z, and the hand-nut S, substantially as herein shown and described.

WILLIAM E. HILL.

Witnesses:
L. S. BAKER,
JNO. R. SNYDER.